US009387979B2

(12) United States Patent
Rapparini

(10) Patent No.: US 9,387,979 B2
(45) Date of Patent: Jul. 12, 2016

(54) CAPSULE FOR OBTAINING BEVERAGES SUCH AS ESPRESSO AND METHOD FOR OBTAINING BEVERAGES SUCH AS ESPRESSO

(71) Applicant: AROMA SYSTEM SRL, Bologna (IT)

(72) Inventor: Gino Rapparini, Bologna (IT)

(73) Assignee: Aroma System SRL, Bologna (IT)

( * ) Notice: Subject to any disclaimer, the term of this patent is extended or adjusted under 35 U.S.C. 154(b) by 0 days.

(21) Appl. No.: 14/385,608

(22) PCT Filed: Mar. 8, 2013

(86) PCT No.: PCT/IB2013/051863

§ 371 (c)(1), (2) Date: Sep. 16, 2014

(87) PCT Pub. No.: WO2013/136240

PCT Pub. Date: Sep. 19, 2013

(65) Prior Publication Data

US 2015/0050391 A1 Feb. 19, 2015

(30) Foreign Application Priority Data

Mar. 16, 2012 (IT) .............................. BO2012A0141
Jul. 20, 2012 (IT) .............................. BO2012A0389

(51) Int. Cl.
*B65D 85/804* (2006.01)
*A23F 5/26* (2006.01)

(52) U.S. Cl.
CPC ............ *B65D 85/8043* (2013.01); *A23F 5/262* (2013.01)

(58) Field of Classification Search
CPC . B65D 85/8043; B65D 85/8046; A23F 5/262
USPC ................. 426/77, 78, 79, 80, 81, 82, 83, 84; 99/295
See application file for complete search history.

(56) References Cited

U.S. PATENT DOCUMENTS 4,136,202 A 1/1979 Favre .............................. 426/77
5,948,455 A * 9/1999 Schaeffer ........... B65D 85/8043 426/112

(Continued)

FOREIGN PATENT DOCUMENTS

AT 510344 3/2012
EP 0806373 11/1997

(Continued)

OTHER PUBLICATIONS

Machine Translation of Frydman WO 2011154672. Dec. 15, 2011.*

*Primary Examiner* — Erik Kashnikow
*Assistant Examiner* — Ericson M Lachica
(74) *Attorney, Agent, or Firm* — Fattibene and Fattibene LLC; Paul A. Fattibene

(57) ABSTRACT

A capsule (1) for obtaining beverages is shown, comprising a side wall (5) and an entry surface (6) for the entrance of water under pressure into the capsule (1), wherein the side wall (5) and the entry surface (6) form the containment volume (V) for containing the infusion product (P). The entry surface (6) comprises one or more reduced thickness areas (3) so that, letting water under pressure flow against the entry surface (6), the one or more reduced thickness areas (3) open, so as to allow water under pressure to enter the capsule (1). The capsule (1) may further comprise one or more strengthening ribs (4) provided on the entry surface (6) so as to strengthen the entry surface (6) and simplify the opening of the reduced thickness areas (3) when water under pressure flows against the entry surface (6). A method for the production of beverages is also shown, comprising the following step: flow of water under pressure against the entry surface (6) of the capsule (1) so as to open the reduced thickness areas (3) of the entry surface (6) so as to allow the water under pressure to enter the capsule (1).

23 Claims, 13 Drawing Sheets

6
0
3
1
5
2

(56) References Cited

U.S. PATENT DOCUMENTS

| | | | | |
|---|---|---|---|---|
| 2002/0015768 | A1* | 2/2002 | Masek | B65D 85/8043 426/115 |
| 2003/0056661 | A1 | 3/2003 | Hu et al. | 99/495 |
| 2005/0084569 | A1 | 4/2005 | Hu et al. | 426/118 |
| 2011/0041702 | A1* | 2/2011 | Yoakim et al. | 99/302 R |
| 2013/0224341 | A1* | 8/2013 | BenDavid | 426/112 |

FOREIGN PATENT DOCUMENTS

| | | | |
|---|---|---|---|
| EP | 1767467 | A1 * | 3/2007 |
| EP | 1982933 | A1 * | 10/2008 |
| EP | 2287090 | | 2/2011 |
| WO | WO 2011/154672 | | 12/2011 |
| WO | WO 2011154672 | A1 * | 12/2011 |
| WO | WO 2012/019902 | | 2/2012 |

* cited by examiner

CAPSULE FOR OBTAINING BEVERAGES SUCH AS ESPRESSO AND METHOD FOR OBTAINING BEVERAGES SUCH AS ESPRESSO

TECHNICAL FIELD

The present invention relates to the technical field of capsules for obtaining beverages such as espresso. In particular, the present invention relates to the field of injection-molded capsules which are hermetically sealed and provided with infusion products, such as espresso coffee, or water-soluble products, such as milk or cocoa.

STATE OF THE ART

Several kinds of injection-molded capsules provided with infusion products such as espresso are known. Some of these capsules are costly because they comprise several details which slow down the manufacturing process of the capsules.

Other kinds of capsules are not hermetically sealed. Consequently, the quality of the product which is contained in these capsules quickly deteriorates. Furthermore, the product may accidentally flow out of the capsule, thus contaminating the environment where the capsule is handled and/or stored.

Examples of capsules which are known from the prior art can be found in U.S. Pat. No. 5,948,455, U.S. Pat. No. 5,242,702, US2003056661, and IT1133901.

The problem to be solved is that of providing an injection-molded capsule which is hermetically sealed and which is basically composed of only two elements, which can be easily manufactured, thus reducing costs, and which allows the production of a high-quality beverage. All these problems are solved by the present invention.

The present invention guarantees a high-quality beverage because, being adapted to be hermetically sealed, It allows the contained product to maintain its organoleptic properties.

SUMMARY

The present invention is based on the idea of allowing entry of water under pressure into a capsule for obtaining beverages, such as espresso or similar, by letting water under pressure flow against an entry surface of the capsule, which is provided with one or more reduced-thickness areas, so that said one or more reduced thickness areas open under the effect of the pressure of the water and allow water under pressure to enter the capsule. The present invention is further based on the idea of providing a capsule for obtaining beverages comprising an entry surface for the entry of water under pressure inside the capsule, wherein the entry surface comprises one or more reduced thickness areas so that, letting water under pressure flow against the entry surface, the one or more reduced thickness areas open so as to allow water under pressure to enter the capsule. The reduced thickness areas are, for example, regions of the entry surface having a smaller thickness than the thickness of the entry surface.

The capsule according to the present invention may be an injection-molded capsule. The capsule according to the present invention may be made of plastic deformable material. Furthermore, the capsule according to the present invention may be made of biodegradable material.

The capsule according to the present invention may be employed for obtaining beverages by means of infusion, such as, for example, tea or coffee, for instance espresso coffee. The capsule may thus contain infusion products, such as tea leaves or coffee powder, i.e. products that are adapted to produce beverages by means of infusion. This means that after the production of the beverage, a solid residue is left inside the capsule. Alternatively, the capsule according to the present invention may be employed for obtaining beverages by means of water-soluble products, such as, for example, powdered milk, cocoa, or similar. In this case, after the production of the beverage, no solid residue or only minimal residue is left inside the capsule.

According to an embodiment of the present invention, a capsule for obtaining beverages is provided comprising a side wall and an entry surface for the entrance of water under pressure into the capsule, the side wall and the entry surface forming the containment volume for containing the infusion product, wherein the entry surface comprises one or more reduced thickness areas, so that, letting water under pressure flow against the entry surface, the one or more reduced thickness areas open, so as to allow water under pressure to enter the capsule. Since the reduced thickness areas of the entry surface open under the influence of the flow of water under pressure, it is possible to avoid the employment of specific components of the beverage-making machine which would be needed for puncturing the capsule. In this way, the machine for using capsules according to the present invention is simplified. Furthermore, the capsule according to the present invention can be manufactured in an easy and inexpensive way. For example, this capsule may be injection-molded. The entry surface may, for example, correspond to the bottom of the capsule. The reduced thickness areas may be formed either on the outer face or on the inner face of the entry surface. When the reduced thickness areas are formed on the outer face of the entry surface, the entry surface may, for example, exhibit blind bores, depressions, or slots which are placed on the outer side of the capsule and are thus visible when the capsule is closed. Alternatively, when the reduced thickness areas are formed on the inner face of the entry surface and, thus, face the inner volume of the capsule, the outer face of the entry surface can be smooth and uniform. The reduced thickness areas may be arranged according to several arrangements on the entry surface.

According to a further embodiment of the present invention, a capsule is provided, wherein the side wall and the entry surface are formed as a single body. In this way, the side wall and the entry surface can be easily manufactured, for example, by means of injection molding.

According to a further embodiment of the present invention, a capsule is provided, further comprising a plane for supporting a sealing element, so as to hermetically seal the capsule, the plane being provided at the extremity of the side wall opposite the entry surface, so that the sealing element forms an exit surface opposite the entry surface for the exit of the beverage from the capsule. The plane provides a surface onto which it is possible to fix the sealing element of the capsule. The capsule can thus be hermetically sealed, so as to preserve the organoleptic properties of the product contained in the capsule. The sealing element may, for example, comprise a peel-off barrier membrane. The sealing element may be made of biodegradable material. The beverage exits from the capsule through the sealing element of same. The sealing element forms an exit surface which is opposite from the entry surface: in this way, water under pressure entering the capsule through the entry surface goes through the entire volume of the capsule before leaving the capsule as a ready-made beverage. In this way, the infusion process is particularly efficient and involves the entire product contained in the capsule. The quality of the beverage obtained is, thus, particularly high. The plane for supporting the sealing element, the side wall and the entry surface may be advantageously formed as a single body. For example, these three elements may be manufactured by means of injection molding.

According to a further embodiment of the present invention, a capsule is provided, wherein the plane for supporting the sealing element has a uniform thickness or comprises a groove on the surface of the plane which faces the entry surface, the groove being adapted to house the peripheral edge of the production volume of a beverage-making machine when the capsule is housed in the production volume, so as to seal the production volume. The presence of the groove is particularly advantageous because it simplifies the hermetic seal of the production volume, thus guaranteeing that the water under pressure entering the volume does not exit therefrom. Since the peripheral edge of the production volume is housed in the groove provided on the surface of the plane for supporting the sealing element which faces the entry surface, the production volume is efficiently sealed when the capsule is housed into same.

According to a further embodiment of the present invention, a capsule is provided, wherein the one or more reduced thickness areas are located along one or more diameters of the entry surface. Placing the reduced thickness areas along one or more of the diameters of the entry surface allows the entry of water under pressure in the capsule in such a way that it is uniformly-distributed in the inner volume of the capsule. The horizontal cross section of the capsule may be, for example, circular, so that the entry surface of the capsule has a circular shape.

According to a further embodiment of the present invention, a capsule is provided, comprising a plurality of reduced thickness areas placed radially with respect to the center of the entry surface. The distribution of water in the inner volume of the capsule is, thus, further optimized. In particular, prevents the capsule from having regions of the volume of the capsule which are not reached by the water flow. In this way, waste of the product contained inside the capsule is avoided, and the quality of the beverage which is produced is optimized.

According to a further embodiment of the present invention, a capsule is provided, comprising one or more reduced thickness areas having a circular shape. This embodiment is particularly easy to manufacture. Furthermore, the circular shape of the reduced thickness areas guarantees a homogeneous distribution of the water entering the capsule through the circular reduced thickness area inside the capsule. In particular, it is possible to avoid in this way that there are regions of the inner volume of the capsule which are not efficiently reached by the flow of water entering the capsule. Furthermore, the capsule could be further provided with a plurality of circular reduced thickness areas, for example, with a plurality of concentric reduced thickness areas. For example, the capsule could be provided with two or three circular reduced thickness areas. These two or three circular reduced thickness areas could be, for example, concentric.

According to a further of the embodiment of the present invention, a capsule is provided wherein the one or more reduced thickness areas having circular shape are centered in the center of the entry surface. This allows the further optimization of the water distribution inside the capsule.

According to a further embodiment of the present invention, a capsule is provided wherein the one or more reduced thickness areas are made of elastic material so that, after having been opened by the flow of water under pressure, they return to the closing position when the flow of water under pressure is stopped. The reduced thickness areas may be for example torn and thus opened under the action of water under pressure. At the same time, thanks to the elasticity of the reduced thickness areas, when the flow of water under pressure stops, they go back to closing position. This is particularly advantageous because it allows to prevent the undesired flow of infusion product from the capsule once the capsule has been used. This improves for example the cleanliness of the machine with which the capsules according to the present invention are used. Furthermore, unwanted spreading of the product contained in the capsule when the capsule is handled after having been used is avoided.

According to a further embodiment of the present invention, a capsule is provided further comprising one or more strengthening ribs provided on the entry surface so as to strengthen the entry surface and ease the opening of the reduced thickness areas when the water under pressure flows against the entry surface. The presence of the strengthening ribs is particularly advantageous because it facilitates the opening of the reduced thickness areas. In particular, the entry surface is reinforced and thus stabilized by means of the strengthening ribs. In this way, the water under pressure pushing from the outside on the entry surface does not modify or only minimally modify the shape of the entry surface and rather opens the reduced thickness areas.

According to a further embodiment of the present invention, a capsule is provided wherein the one or more strengthening ribs do not intersect the one or more reduced thickness areas of the entry surface, in this way, the reduced thickness areas are not obstructed by the presence of the strengthening ribs and can thus easily open under the action of water under pressure.

According to a further embodiment of the present invention, a capsule is provided wherein at least one of the one or more strengthening ribs intersects the center of the entry surface. This embodiment of the present invention is particularly advantageous because it allows the efficient reinforcement of the entry surface of the capsule. Since the center of the entry surface is provided with at least a strengthening rib, the deformation of the entry surface under the action of the water under pressure is efficiently avoided or reduced. This further simplifies the opening of the reduced thickness area under the action of water under pressure.

According to a further embodiment of the present invention, a capsule is provided wherein the one or more strengthening ribs are placed along one or more of the diameters of the entry surface. The reinforcement of the entry surface is optimized by means of this particular disposition of the strengthening ribs.

According to further embodiment of the present invention, a capsule is provided comprising a plurality of strengthening ribs placed radially with respect to the center of the entry surface. The reinforcement of the entry surface is optimized by means of this particular disposition of the strengthening ribs.

According to a further embodiment of the present invention, a capsule is provided wherein the strengthening ribs intersect in the center of the entry surface. This allows reinforcing the entry surface of the capsule in a particularly efficient way.

According to further embodiment of the present invention, a capsule is provided wherein the one or more strengthening ribs are made of elastic material so as to allow the entry surface to bend under the action of the water under pressure and to return to the original configuration when the flow of water under pressure is stopped. The presence of strengthening ribs made of elastic material allows the entry surface of the capsule to slightly bend under the action of the water under pressure and, at the same time, to go back to the substantially flat original configuration when the flow of water under pressure stops.

According to a further embodiment of the present invention, a capsule is provided wherein the elasticity of the one or more reduced thickness areas is higher than the elasticity of the strengthening ribs. In this way, the reduced thickness areas have a higher bend with respect to the strengthening ribs and they are easily opened under the action of water under pressure. Furthermore, the elasticity of the strengthening ribs simplifies the closure of the reduced thickness area after they have been opened and after the flow of water under pressure is stopped because the strengthening ribs contribute to bring the entry surface back to the original substantially flat configuration wherein the reduced thickness areas are closed. The unwanted outflow of infusion product contained in the capsule is thus effectively avoided.

According to a further embodiment of the present invention, a capsule is provided wherein the strengthening ribs are located inside the capsule. The capsule can thus be easily manufactured. Furthermore, the capsule can be easily handled.

According to a further embodiment of the present invention, a capsule is provided wherein at least one of the strengthening ribs comprises a base portion substantially parallel and adjacent to the entry surface and an arm at each of the extremities of the base portion so that the strengthening rib is substantially U-shaped. The arms could be for example substantially perpendicular to the base portion. Furthermore, the arms could extend along a direction which is substantially parallel to the direction of the side wall of the capsule. If for example the side wall has a frustoconical shape, the arms could be tilted with respect to the perpendicular to the base portion so as to follow the tilted orientation of the side wall. The arms of the strengthening rib could be adjacent to the inner surface of the side wall of the capsule. For example, the surface of the arms of the strengthening rib could be perpendicular to the side wall of the capsule and the edges of the surface which face toward the outer region of the capsule are in contact with the inner face of the side wall. The base portion and the arms could be made as a single body. For example, they could be made by means of injection molding. The presence of the ribs being substantially a U-shaped is particularly advantageous because it allows to strengthen the entire structure of the capsule. Furthermore, the ribs being substantially U-shaped reduce the elasticity of the surface of the entry surface of the capsule only in the regions where they are present and thus do not eliminate the overall elasticity of the entry surface.

According to a further embodiment of the present invention, a capsule is provided wherein at least one of the strengthening ribs comprises a first portion substantially parallel and adjacent to the side wall and a second portion substantially parallel and adjacent to the entry surface so that the strengthening rib is substantially L-shaped. This configuration of the strengthening ribs is particularly advantageous, for example, in case the reduced thickness areas have a circular shape. In this case, the second portion of the strengthening rib could advantageously extend from the side surface of the capsule to a position which is adjacent to the reduced thickness area so as to reinforce the portion of the entry surface of the capsule which is outwardly located with respect to the circular reduced thickness area.

According to further embodiment of the present invention, a method is provided for producing beverages by means of a capsule according to the present invention comprising the following step: flow of water under pressure against the entry surface of the capsule so as to open the reduced thickness areas of the entry surface so as to allow the water under pressure to enter the capsule. The reduced thickness areas open because of the flow of water under pressure. This allows avoiding to employ specific components of the machine which would be necessary for puncturing the capsule. The method according to the present invention allows therefore obtaining in a simple way beverages having an optimum quality.

According to further embodiment of the present invention, a method is provided further comprising the following step: puncturing of an kit surface of the capsule opposed with respect to the entry surface so as to allow the beverage to exit from the capsule. The exit surface may for example correspond to the sealing element with which the capsule is hermetically sealed after having been filled with the infusion product.

According to a further embodiment of the present invention, a capsule is provided wherein the strengthening ribs on the inner bottom of the capsule are aimed to simplify the opening of the reduced thickness areas when the capsule is subject to an external pressure and to bring these areas elastically in a closed position when the outer pressure stops thus preventing coffee particles from exiting from the capsule. The inner ribs are not directly in contact with the reduced thickness areas but are rather disposed according to several arrangements.

According to a further embodiment of the present invention, a capsule is provided wherein the reduced thickness areas are obtained on the bottom wall of the capsule either from the inside to the outside or from the outside to the inside.

According to a further embodiment of the present invention, a capsule is provided wherein the upper plane has a uniform thickness, it is made of the same material of the capsule and it is sufficiently thick and elastic so as to deform under the pressure of the peripheral edge of a hollow cylinder for the production of a beverage in a machine for using capsules, thus forming an hermetic seal between the plane of the capsule and the peripheral edge, even when the peripheral edge of the cylinder is not flat and continuous but rather toothed.

According to a further embodiment of the present invention, a capsule is provided wherein the sealing element comprises a barrier film membrane. The membrane could be easily outwardly deformed by the water under pressure which is injected inside the capsule, so that the beverage remains under infusion for a predetermined period of time before flowing out through the hole or holes that are made on the sealing membrane.

According to a further embodiment of the present invention, an injection molded capsule is provided for obtaining infusions such as espresso, the capsule comprising an upper plane having uniform thickness and reduced thickness areas on the bottom and strengthening ribs, the capsule being adapted to be hermetically sealed by means of a sealing element, characterized in that housing the capsule in a hollow cylinder which hermetically seal the volume on the upper plane of the capsule and injecting water under pressure inside the hollow cylinder, the reduced thickness areas of the capsule in cooperation with the strengthening ribs open and water under pressure enter the capsule, deforming the sealing element outwardly so that the sealing element touches needles of the machine and is punctured so that the beverage can flow outside from the capsule.

According to a further embodiment of the present invention, a capsule is provided wherein, since the reduced thickness areas are made of elastic material, they flex more than the strengthening ribs under the action of the pressure of the water and they open.

According to a further embodiment of the present invention, a capsule is provided characterized in that since the strengthening ribs are made of elastic material, they flex under the action of the water pressure and they go back to the original position when the pressure stops thus causing the closing of the reduced thickness areas which were opened under the action of the water pressure.

According to a further embodiment of the present invention, a capsule is provided characterized in that when the capsule is subjected to the external pressure of water, the reduced thickness areas which are more elastic than the strengthening ribs are torn and opened so that water enters into the capsule. When the pressure stops, the strengthening ribs bring the reduced thickness area to the closed position thus preventing the product from exiting from the capsule.

According to a further embodiment of the present invention, a capsule is provided having strengthening ribs in its inner volume whose shape and position is aimed to simplify the opening of the reduced thickness areas when the capsule is subject to an external pressure and to bring said areas back to the closed position when the pressure stops.

BRIEF DESCRIPTION OF THE DRAWINGS

The present invention will now be described with reference to the attached drawings, wherein the same reference numbers and/or similar reference numbers relate to the same parts and/or to similar and/or corresponding parts of the system. In the drawings.

DETAILED DESCRIPTION

Figure 1:
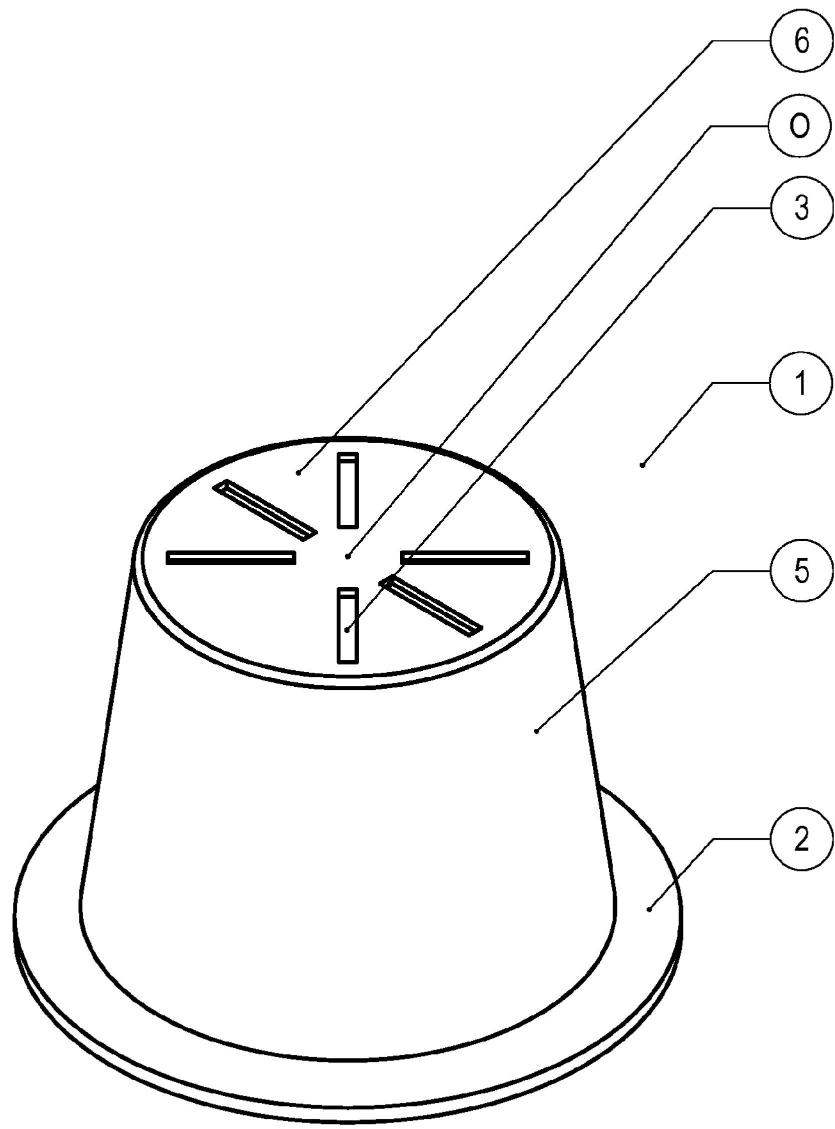
FIG. 1 schematically displays a three-dimensional outer view of a capsule according to an embodiment of the present invention.

In the following, the present invention is described with reference to particular embodiments as shown in the appended drawings. Nevertheless, the present invention is not limited to the particular embodiments described in the following detailed description and shown in the drawings, but rather, the embodiments described simplify several aspects of the present invention, the scope of which is defined by the claims. Further modifications and variations of the present invention will be clear to the skilled person.

FIG. 1 schematically displays an outer three-dimensional view of a capsule 1 for obtaining infusions, such as espresso. Capsule 1 comprises a side wall 5 and an entry surface 6 for allowing the entry of water under pressure inside the capsule 1. The side wall 5 and the entry surface 6 are formed as a single body. In particular, the side wall 5 and the entry surface 6 are made by the same material and can be, for example, made by means of injection molding. For example, the side wall 5 and the entry surface 6 may be made of plastic deformable material. Furthermore, the side wall 5 and the entry surface 6 form the containment volume V for containing the infusion product or the water soluble product for the production of the desired beverage. In the example shown in FIG. 1, the entry surface 6 corresponds to the bottom of the capsule 1.

FIG. 1 shows that the entry surface 6 is provided with reduced thickness areas 3. The reduced thickness areas 3 are areas of the entry surface 6 having a reduced thickness with respect to the thickness of the other areas of the entry surface 6.

According to the present invention, the reduced thickness area may have, for example, a thickness varying between a half and 1/20th with respect to the thickness of the entry surface. Preferably, the reduced thickness areas have a thickness between 1/5th and 1/15th of the thickness of the entry surface. The reduced areas may have, for example, a thickness corresponding to 1/10th of the thickness of the entry surface. For example, the entry surface may have a thickness corresponding to approximately 0.5 mm, while the reduced thickness areas may have a thickness of about 0.05 mm.

FIG. 1 displays the presence of six reduced thickness areas 3 on the entry surface 6. The number of reduced thickness areas 3 may vary. The entry surface 6 may for example, comprise a single reduced thickness area. Furthermore, the entry surface 6 may comprise two or more reduced thickness areas 3.

The entry surface 6 has a circular shape and the reduced thickness areas 3 comprise slots which are placed along three of the diameters of the entry surface 6. The length of the slots corresponds to a portion of each of the diameters of the entry surface 6. The reduced thickness areas 3 are placed radially with respect to the center O of the entry surface 6.

The number and the disposition of the reduced thickness areas 3 on the entry surface 6 may vary.

The reduced thickness areas 3 shown in the example of FIG. 1 are formed from the outside towards the inside of the capsule 1. In particular, the outer face of the entry surface 6 is not flat and smooth, but rather exhibits depressions or grooves which correspond to the reduced thickness areas 3.

Alternatively, according to the present invention, the reduced thickness areas may be formed from the inside toward the outside of the capsule. In this case, the outer face of the entry surface 6 is flat and smooth, while the face of the entry surface 6 inside the capsule exhibits depressions or grooves corresponding to the reduced thickness areas 3.

Capsule 1 shown in FIG. 1 further comprises a uniform thickness plane 2. In particular, FIG. 1 shows the lower surface of the uniform thickness plane 2, i.e. the surface of uniform thickness plane 2 facing the bottom of the capsule or, in any case, facing the entry surface 6 for the water.

The uniform thickness plane 2 is provided at the extremity of the side wall 5 opposite with respect to the extremity of the side wall 5 to which the entry surface 6 for water under pressure is provided. The uniform thickness plane 2, the side wall 5 and the entry surface 6 may be advantageously formed as a single body. For example, the uniform thickness plane 2, the side wall 5 and the entry surface 6 may be made of the same material, for example deformable plastic material. These three elements could be, for example, manufactured by means of injection molding.

The plane 2 may be alternatively provided with a groove on the surface of the plane 2 which faces the entry surface 6. These groove may be adapted to house the peripheral edge of the production volume of a beverages-making machine when the capsule 1 is housed in the production volume so as to seal the production volume.

The horizontal cross-section of the capsule 1 shown in FIG. 1 is circular. The entry surface 6 has a circular shape. Similarly, the uniform thickness plane 2 consists of an annular border which is substantially parallel to the entry surface 6. The side wall 5 has a frustoconical shape.

The upper base of the truncated cone corresponds to the bottom of the capsule and thus to the entry surface 6. The lower base of the truncated cone is surrounded by the annular structure of the uniform thickness plane 2. Alternatively, the side wall 5 could have a cylindrical shape. Furthermore, according to alternative embodiments of the present invention, the horizontal cross-section of the system could be polygonal, for example, square or hexagonal.

Figure 2:
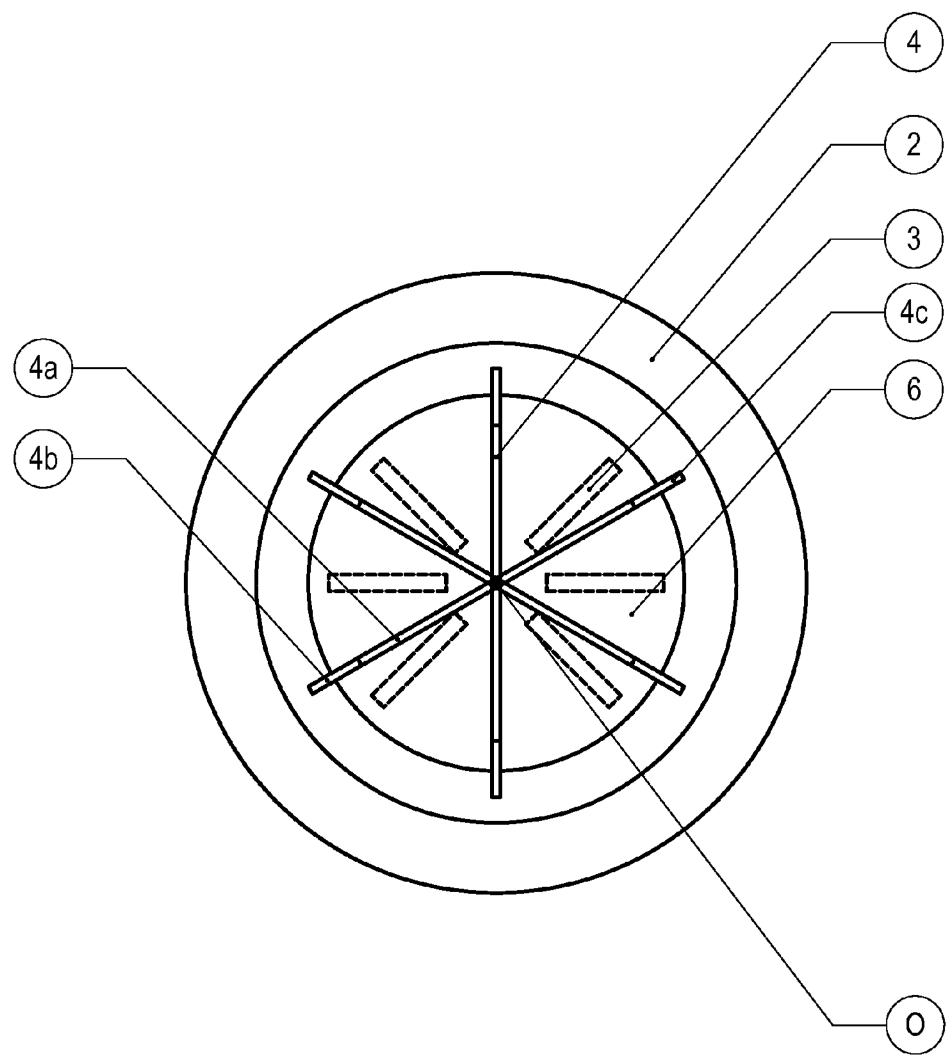
FIG. 2 schematically displays an inner top view of the capsule according to an embodiment of the present invention.

FIG. 2 schematically displays a top inner view of the capsule 1 shown in FIG. 1.

The figure shows the upper surface of plane 2.

The figure further shows the inner face of the entry surface 6 for the entrance of water under pressure. The reduced thickness areas 3 of the entry surface 6 are shown by dashed lines.

The figure shows also that the inner face of the entry surface 6 is provided with strengthening ribs 4. The strengthening ribs 4 reinforce the entry surface 6 and promote the opening of the reduced thickness areas 3 when water under pressure flows against the outer face of the entry surface 6.

The strengthening ribs 4 shown in FIG. 2 do not intersect the reduced thickness areas 3. Furthermore, the strengthening ribs 4 are placed along 3 diameters of the entry surface 6 and intersect in the center O of the entry surface 6. The strengthening ribs 4 occupy a length substantially corresponding to the length of the diameter of the inner face of the entry surface 6.

The number and disposition of the strengthening ribs 4 on the entry surface 6 may vary. For example, the system may comprise a single strengthening rib 4. Alternatively, the system may comprise two or more strengthening ribs 4. FIG. 2 shows three strengthening ribs 4.

Figure 3:
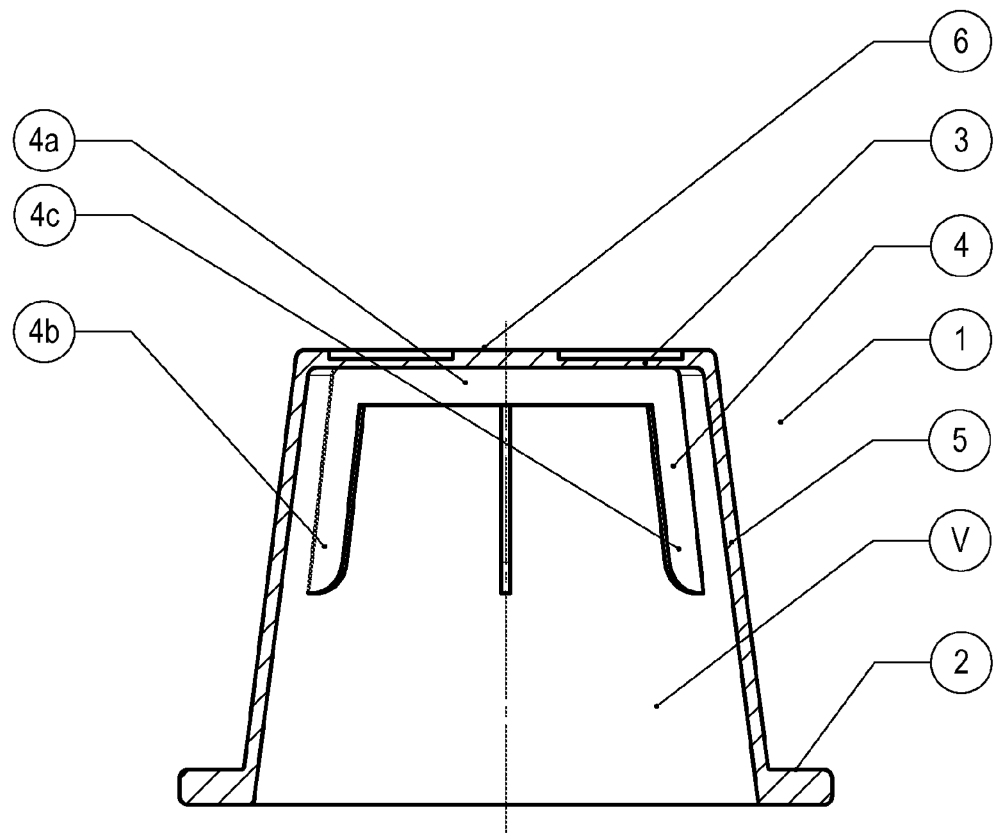
FIG. 3 schematically shows a cutaway section of the capsule according to an embodiment of the present invention, wherein the cutaway is along one of the diameters of the entry surface along which reduced thickness areas are present.

FIG. 3 schematically shows a cutaway section of the capsule 1 shown in FIGS. 1 and 2 along one of the diameters of the entry surface 6 along which reduced thickness areas 3 are realized.

It is possible to notice that the side wall 5 and the entry surface 6 form the containment volume V of the capsule 1, namely the volume that can be filled with the product which is necessary for the production of the desired beverage.

The figure shows in section two of the reduced thickness areas 3 of the entry surface 6. The two reduced thickness areas are formed from the outside toward the inside of the capsule.

Figure 3A:
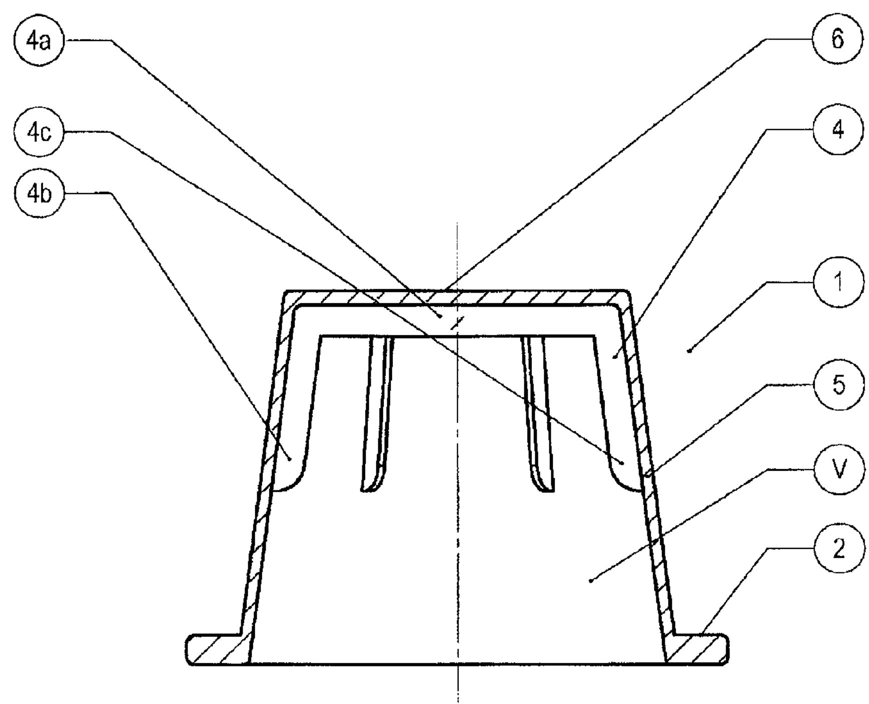
FIG. 3A schematically displays a cutaway section of the capsule of FIG. 3 along one of the diameter of the entry surface along which a strengthening rib is present.

FIG. 3A schematically displays a cutaway section of the capsule shown in FIG. 3 along one of the diameters of the entry surface 6 along which a strengthening rib 4 is realized.

FIG. 3A shows thus in detail the structure of one of the strengthening ribs 4. The strengthening rib is substantially U-shaped with a base portion **4*a* substantially parallel and adjacent to the inner face of the entry surface 6 and two arms, 4*b* and 4*c*. The arms 4*b* and 4*c* extend along a direction which is substantially parallel to the side wall 5 of the capsule 1. In particular, in the case shown in FIG. 3A the base portion 4*a* of the rib 4 has a length corresponding to the diameter of the inner face of the entry surface 6. Arms 4*b* and 4*c* extend in a direction substantially parallel to the frustoconical side wall 5 of the capsule so that the projection of the arms 4*b* and 4*c* on the plane of the entry surface 6 occupy a length which is higher with respect to the diameter of the inner face of the entry surface 6. Arms 4*b* and 4*c* of the strengthening rib are adjacent to the inner surface of the side wall 5 of the capsule. The surface defined by arms 4*b* and 4*c* and by base portion 4*a* of the strengthening rib 4 is perpendicular to the side wall 5 of the capsule and the lateral edges of these surfaces are in contact with the side wall 5**.

This aspect is visible also in FIG. 2 wherein the circle having lowest diameter represent the inner face of the entry surface 6. The circle having an intermediate diameter represents the opening of the volume V of the capsule at the level of the plane 2. It is possible to notice that the extremities of the arms **4*b* and 4*c* protrude with respect to the circle having the lowest diameter because the arms 4*b* and 4*c* follow the bend slope of the frustoconical side wall 5**.

According to alternative embodiments of the present invention, arms **4*b* and 4*c* may also extend in a direction substantially perpendicular with respect to the base portion 4*a*** inside the containment volume V of the capsule.

Furthermore, in the example shown in FIG. 3A, arms **4*b* and 4*c* of the strengthening rib 4** have a height corresponding to about half the height of the containment volume V of the capsule. The arms could have several heights. For example, the arms of the strengthening rib could occupy the entire height of the lateral surface of the capsule.

The presence of the ribs which are substantially U-shaped is particularly advantageous because it allows to strengthen the entire structure of the capsule.

Figure 4:
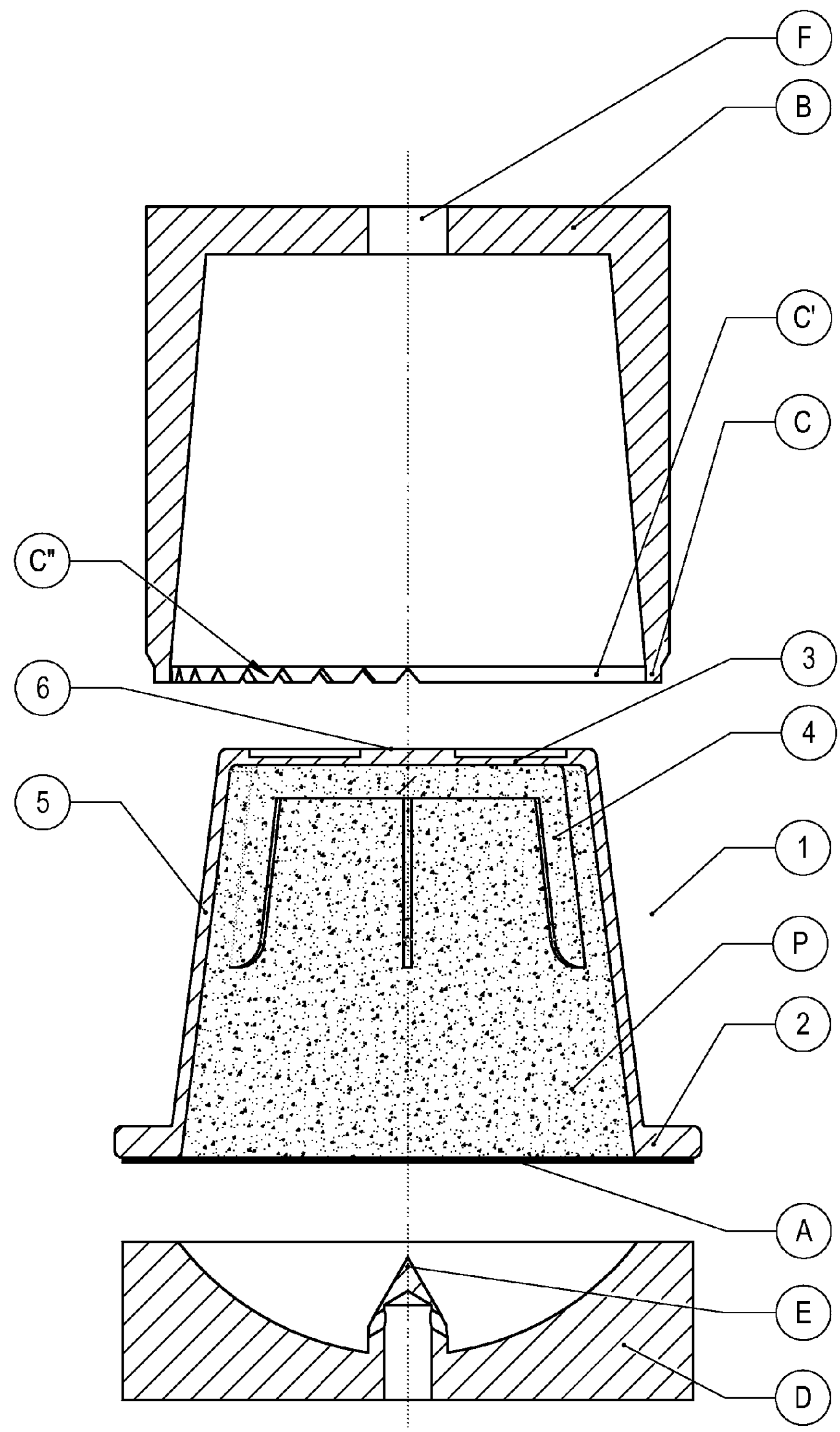
FIG. 4 schematically displays a cutaway section of the capsule according to an embodiment of the present invention; the inner product, the sealing element, a hollow production cylinder having smooth or toothed peripheral edges and a disc presenting a needle for puncturing the exit surface of the capsule, are also displayed.

FIG. 4 schematically displays a view of the capsule 1 shown in Figures from 1 to 3 when it is filled with product P and it is hermetically sealed by means of the sealing element A. Some of the elements of the beverages-making machine are also shown wherein the capsules according to the present invention can be used. In particular, a hollow cylinder B for the production of the beverage is shown having a smooth peripheral edge or a toothed peripheral edge and a disc D carrying a needle E for puncturing the exit surface of the beverage from the capsule.

The containment volume V of the capsule 1 is filled by product P. The product P may comprise, for example, coffee powder, tee leaves or other herbal leaves, milk powder, cocoa powder and so on. In general, product P may be an infusion product or a water soluble product.

Sealing element A is fixed to the capsule 1 by means of plane 2 so as to hermetically seal the capsule 1. For example, sealing element A may be heat-sealed to the upper surface of the plane 2. Sealing element A may comprise a peel-off barrier film membrane.

Capsules according to the present invention may be advantageously used in beverage-making machines which are already present on the market. For example, capsules according to the present invention may be used in machines such as those described in EP 1 816 935 B1.

FIGS. 4 to 9 schematically show some of the components of beverage-making machines which can be used with capsules according to the present invention.

FIG. 4 shows for example the production cylinder B inside which the capsule 1 according to the present invention can be housed during the production phase. The production cylinder B is provided with a hole F for entry of water under pressure. The opposite base of the production cylinder B may comprise a smooth peripheral edge. C' or a toothed peripheral edge C".

A production disc D of the machine carrying a needle E for puncturing the exit surface of the beverage from the capsule so as to obtain the beverage from the capsule is also shown. The production disc D of the machine may further comprise two or more needles for puncturing the exit surface of the capsule.

Figure 5:
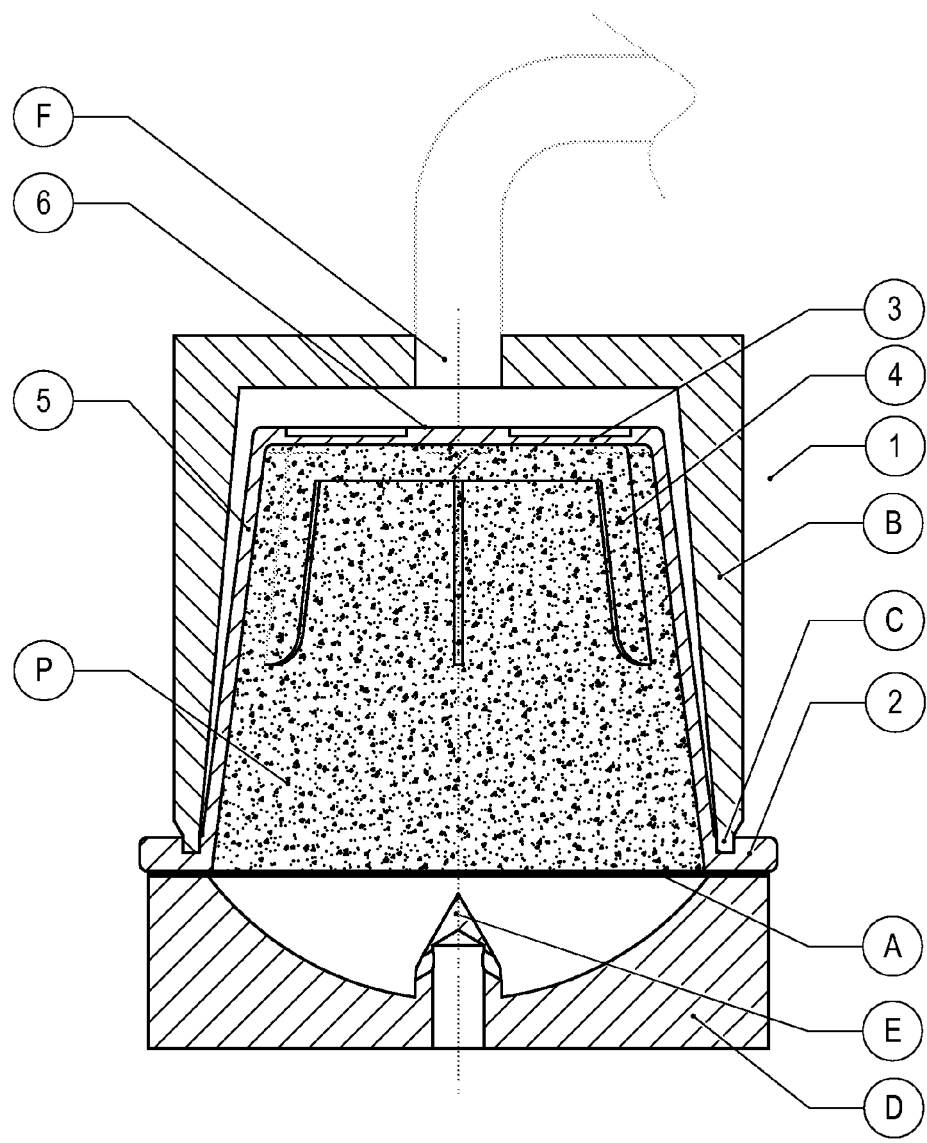
FIG. 5 schematically displays a cutaway section of the capsule when the production cylinder housing the capsule is hermetically sealed on the plane of the surface against the disc carrying a needle.

FIG. 5 schematically displays a view of the capsule 1 when the production cylinder B, housing the capsule, is hermetically sealed on the plane of the capsule by means of the action of the disc D carrying the needle E.

Capsule 1 is housed inside the production cylinder B of the machine. The peripheral edge C of the production cylinder B penetrates into the lower surface of the plane having uniform thickness 2 of the capsule 1 so as to seal the housing volume of the production cylinder B. In particular, the material of the uniform thickness plane 2 is such that the peripheral edge C of the production cylinder B can penetrate into the lower surface of the uniform thickness plane 2, for example because of the action of the pressure due to the production disc D of the machine on the upper surface of the capsule, for example on the peripheral surface of the outer face of the sealing element A of the capsule.

The diameter of the side wall 5 of the capsule 1 in proximity of the lower surface of the uniform thickness plane 2 may advantageously substantially correspond to the diameter of the peripheral edge C of the production cylinder B of the machine into which the capsule is used.

According to alternative embodiments of the present invention, the plane 2 does not have a uniform thickness but is rather provided on its surface facing the entry surface 6 of the capsule 1 with a groove which is adapted to house the peripheral edge C of the production cylinder B. In this way, it is not necessary that the peripheral edge C of the production cylinder B penetrates into the lower surface of the plane 2. The seal of the production volume is in fact realized by means of the coupling between the peripheral edge of the production cylinder B and the groove of the lower surface of plane 2.

Figure 6:
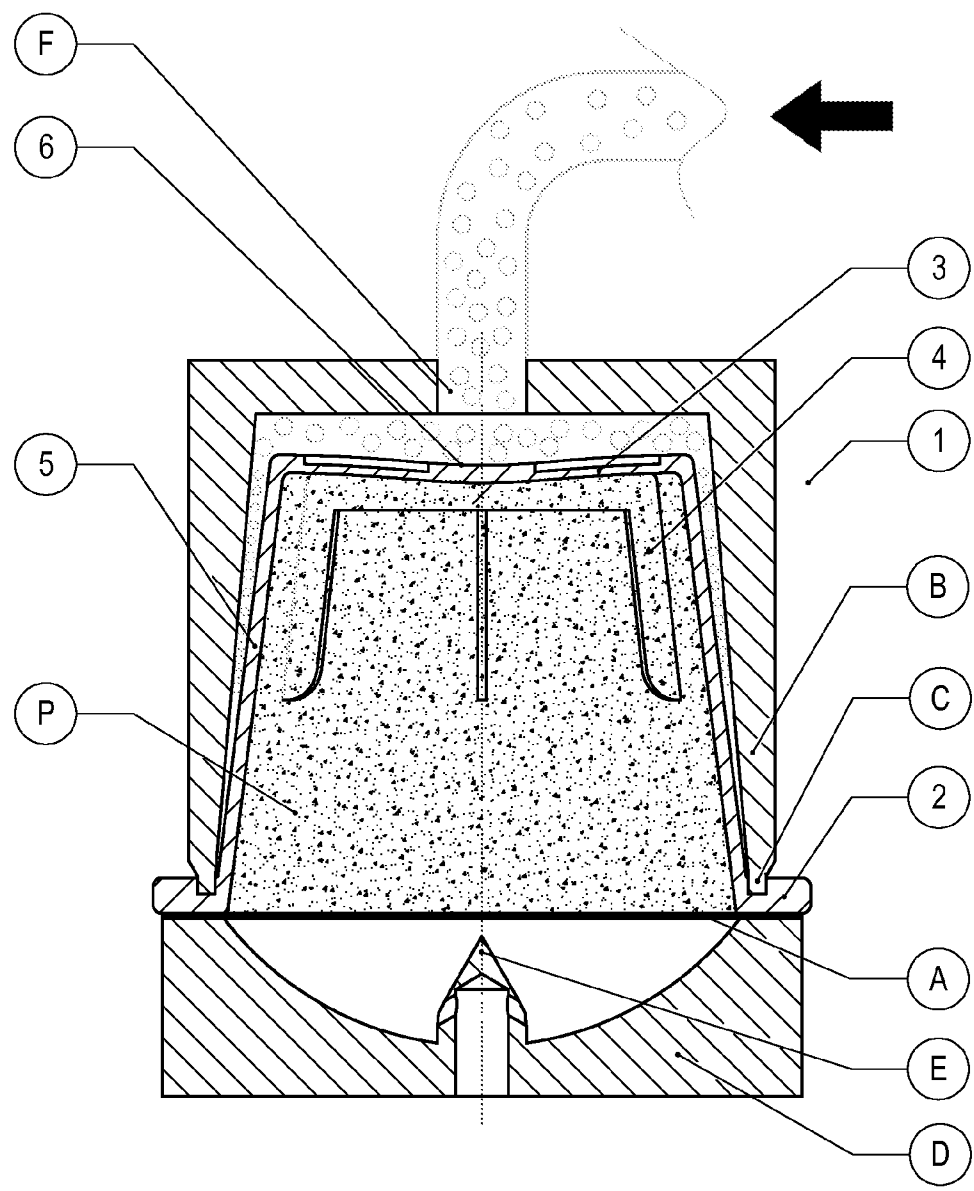
FIG. 6 schematically shows a cutaway section of the system shown in FIG. 5 when the injection means has started injecting water under pressure and the bottom of the capsule is bending.

FIG. 6 schematically displays a view of the system shown in FIG. 5 when the injection means starts injecting water under pressure in the housing volume of the production cylinder B.

Since the housing volume of the production cylinder B is sealed by means of the seal between the peripheral edge C and the lower surface of the plane 2 of capsule 1, the water under pressure which is injected in the housing volume of the production cylinder B pushes against the outer face of the entry surface 6 of the capsule. FIG. 6 shows that the entry surface 6 slightly bends towards the inside of the capsule under the action of the pressure of water. This bending is opposed and limited by the presence of the strengthening ribs 4.

Figure 7:
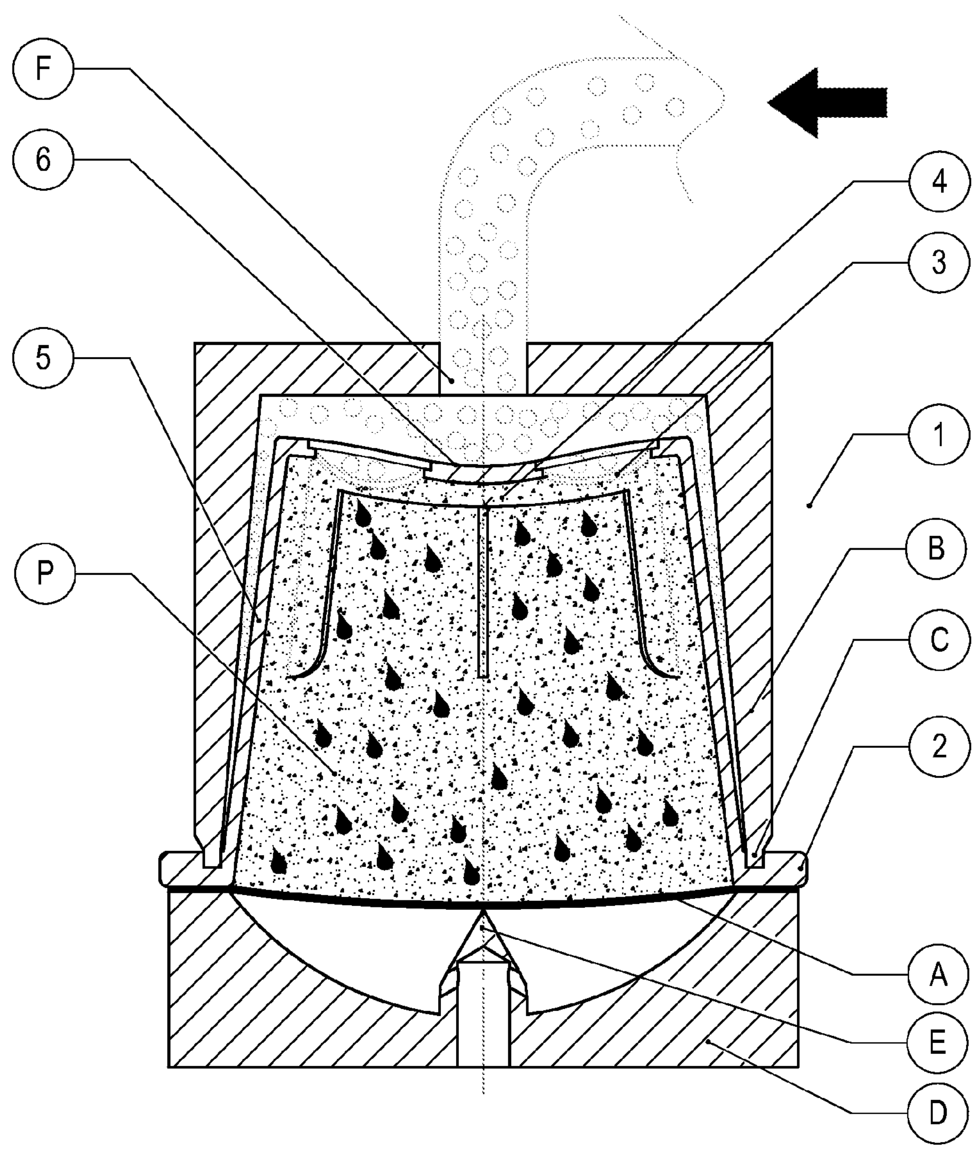
FIG. 7 schematically displays a cutaway section of the system shown in FIG. 6, wherein the bottom of the capsule under pressure is further bent and the reduced thickness area is open, water has entered the capsule, and the sealing element is outwardly deformed, thus reaching the needle; the pre-infusion phase is started.

FIG. 7 schematically displays a view of the system shown in FIG. 6 when the pressure of water present in the housing volume of the production cylinder B further increases. The entry surface 6 of capsule 1 is more bent with respect to the situation shown in FIG. 6, but, at the same time, the reduced thickness areas 3 of the bottom of the capsule are open under the action of water under pressure thus allowing water under pressure to enter inside the capsule 1.

Water under pressure thus enters the containment volume V of the capsule wherein the product P is contained. The pre-infusion phase of the product P contained in the capsule starts when the product P is an infusion product. If, on the contrary, the product P is a water soluble product, the dissolution of the product starts.

FIG. 7 further shows that increasing the pressure of the liquid inside the capsule 1, the exit surface of the capsule opposite to the entry surface 6 bends outwardly, thus reaching the apex of the needle E of the production disc D of the machine.

Figure 8:
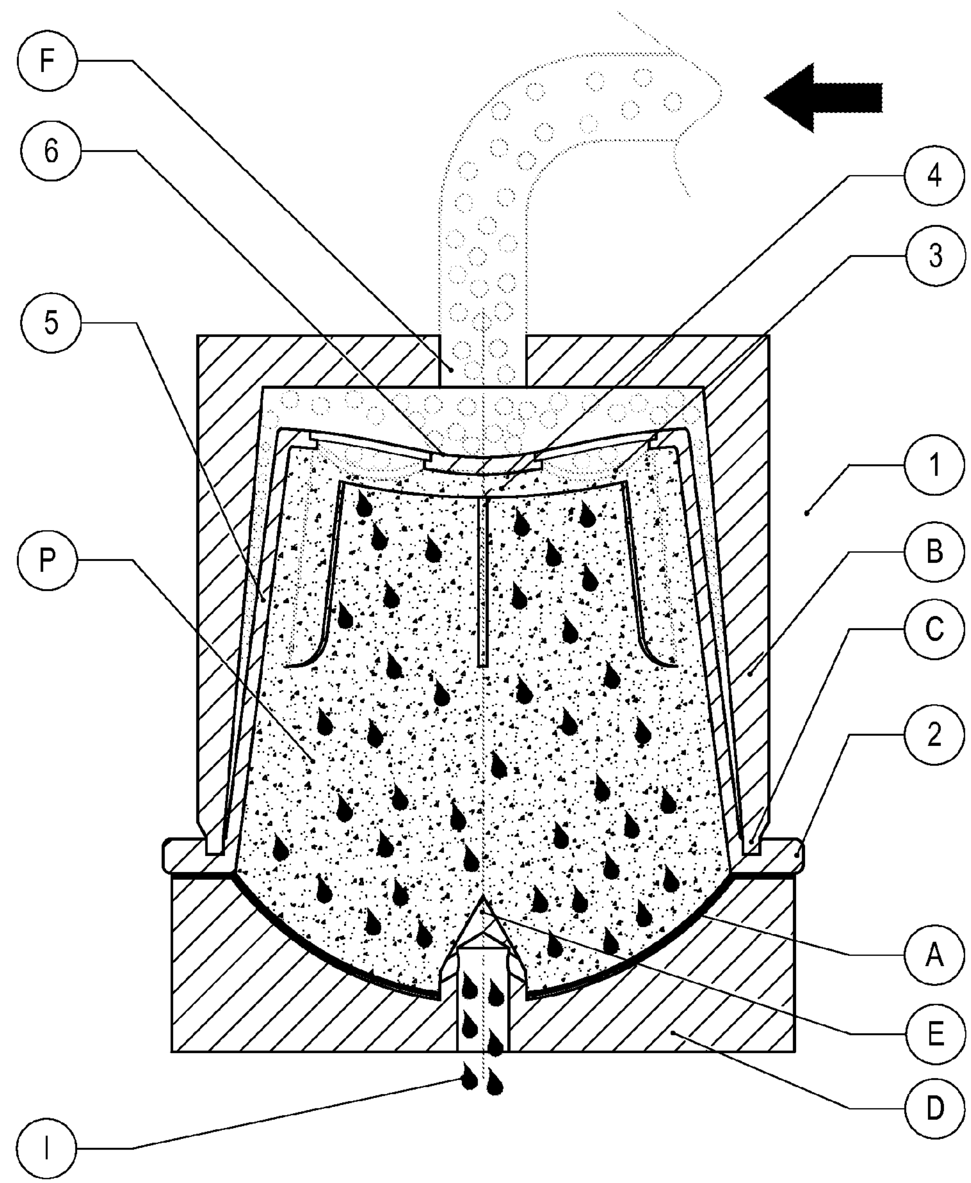
FIG. 8 schematically displays a cutaway section of the system shown in FIG. 7, wherein the sealing element is further outwardly deformed, the needle has punctured the sealing element and the beverage flows out of the capsule.

FIG. 8 schematically displays a view of the system shown in FIG. 7 when the pressure inside the capsule 1 is further increased. In particular, the bending of the exit surface of the capsule is such that the needle E of the production disc D of the machine punctures the sealing element so that the beverage I flows outside. Since the injection means continue injecting water under pressure inside the housing volume of the cylinder of the machine and, thus, against the entry surface of the capsule, this surface remains bent, and the reduced thickness areas 3 of the surface 6 are open allowing the continuous flow of water inside the capsule 1. Adjusting the flow of water injected by the injection means, it is, thus, possible to adjust both the quantity and the quality of the beverage obtained.

Figure 9:
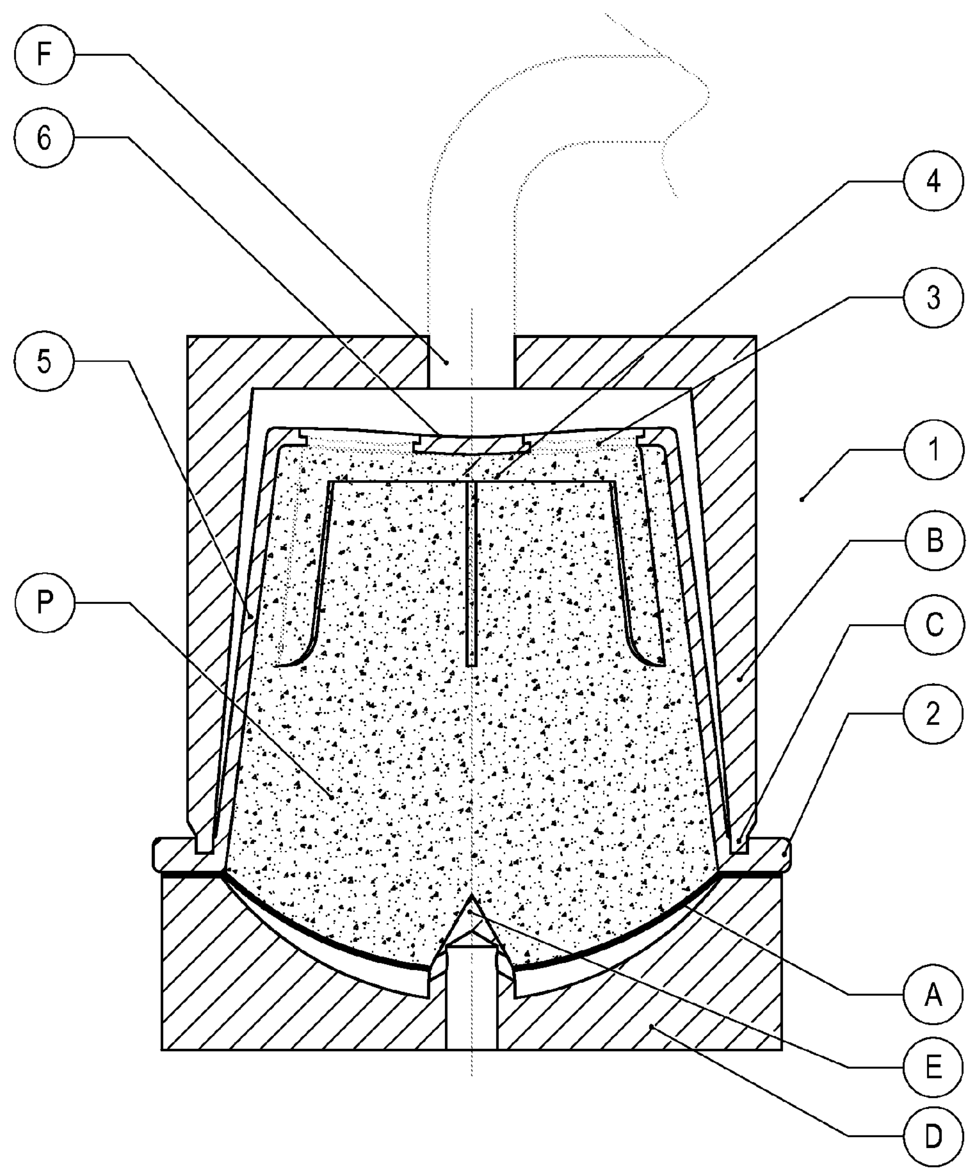
FIG. 9 schematically displays a cutaway section of the system shown in FIG. 8 when the injection means have stopped injecting water inside the capsule and the bottom is flat due to the elastic action of the strengthening ribs, thus contributing to the closing of the reduced thickness areas.

FIG. 9 schematically displays a view of the system shown in FIG. 8 when the injection means stops injecting water.

The entry surface 6 of capsule 1 substantially returns to a substantially flat position under the elastic action of the strengthening ribs 4. This also contributes to the closure of the reduced thickness areas 3, thus avoiding the undesired exit of the residue of product P.

Figure 10:
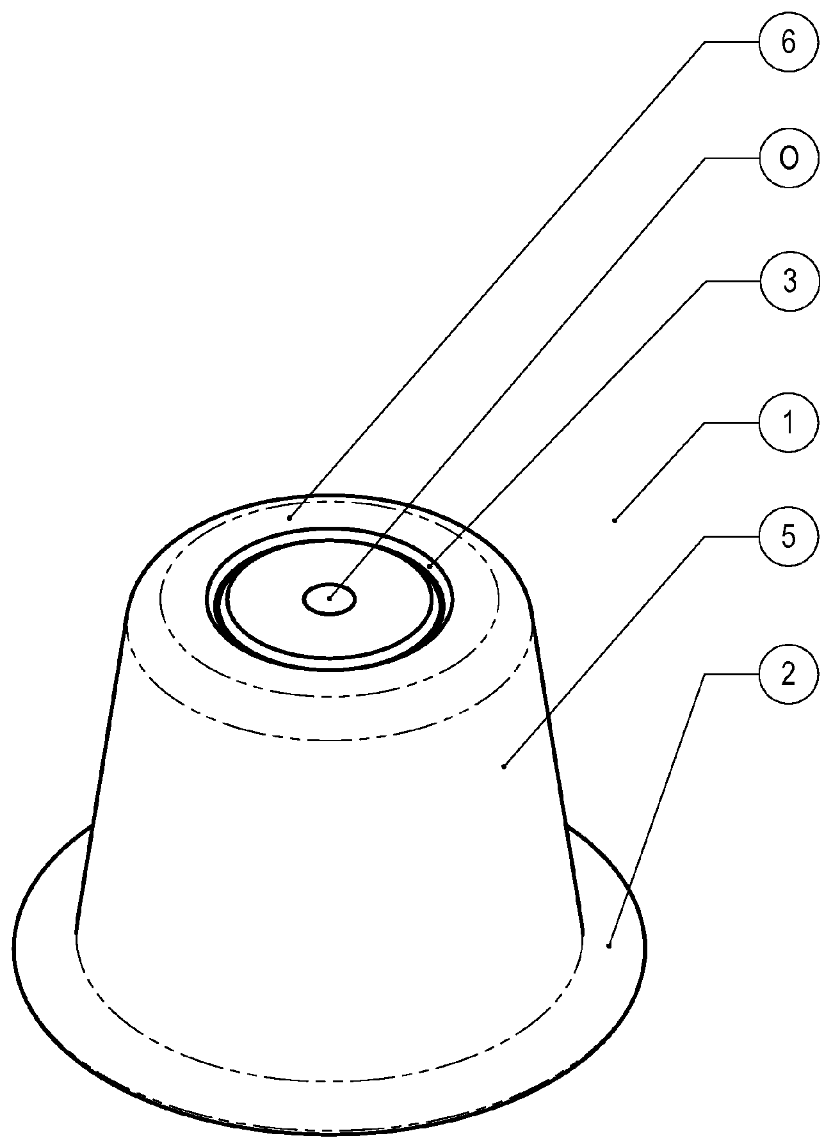
FIG. 10 schematically displays an outer three-dimensional view of a capsule according to a further embodiment of the present invention.
Figure 11:
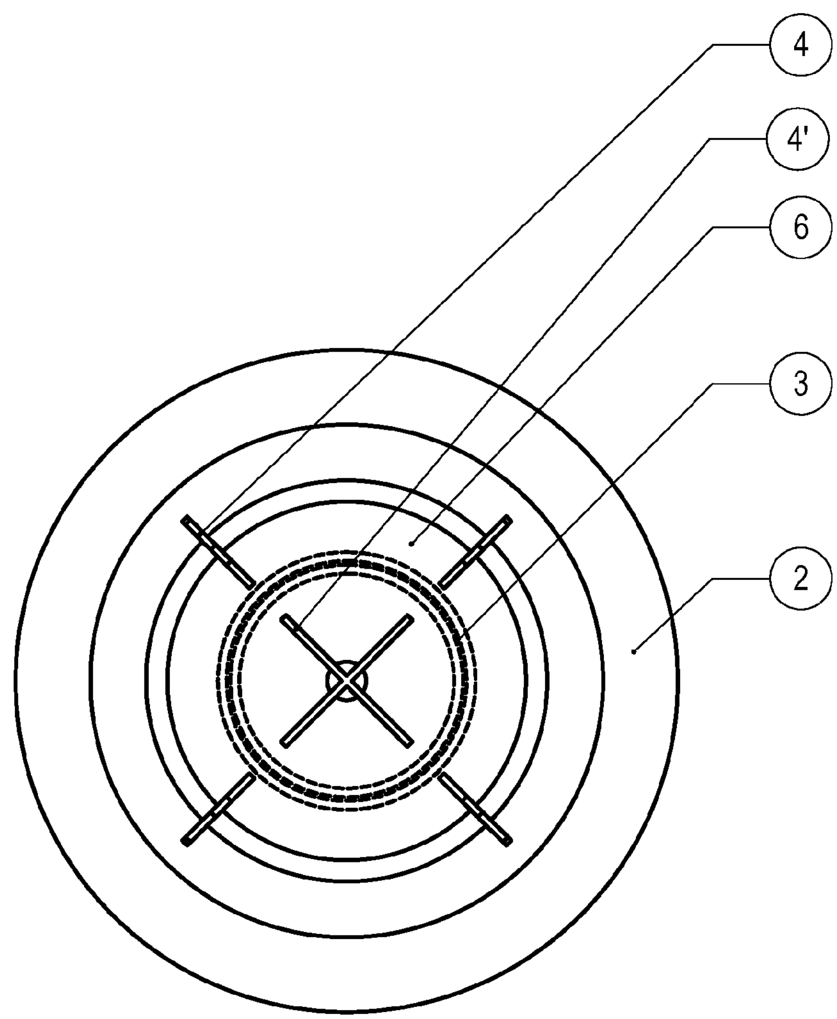
FIG. 11 schematically displays an inner top view of the capsule shown in FIG. 10.
Figure 12:
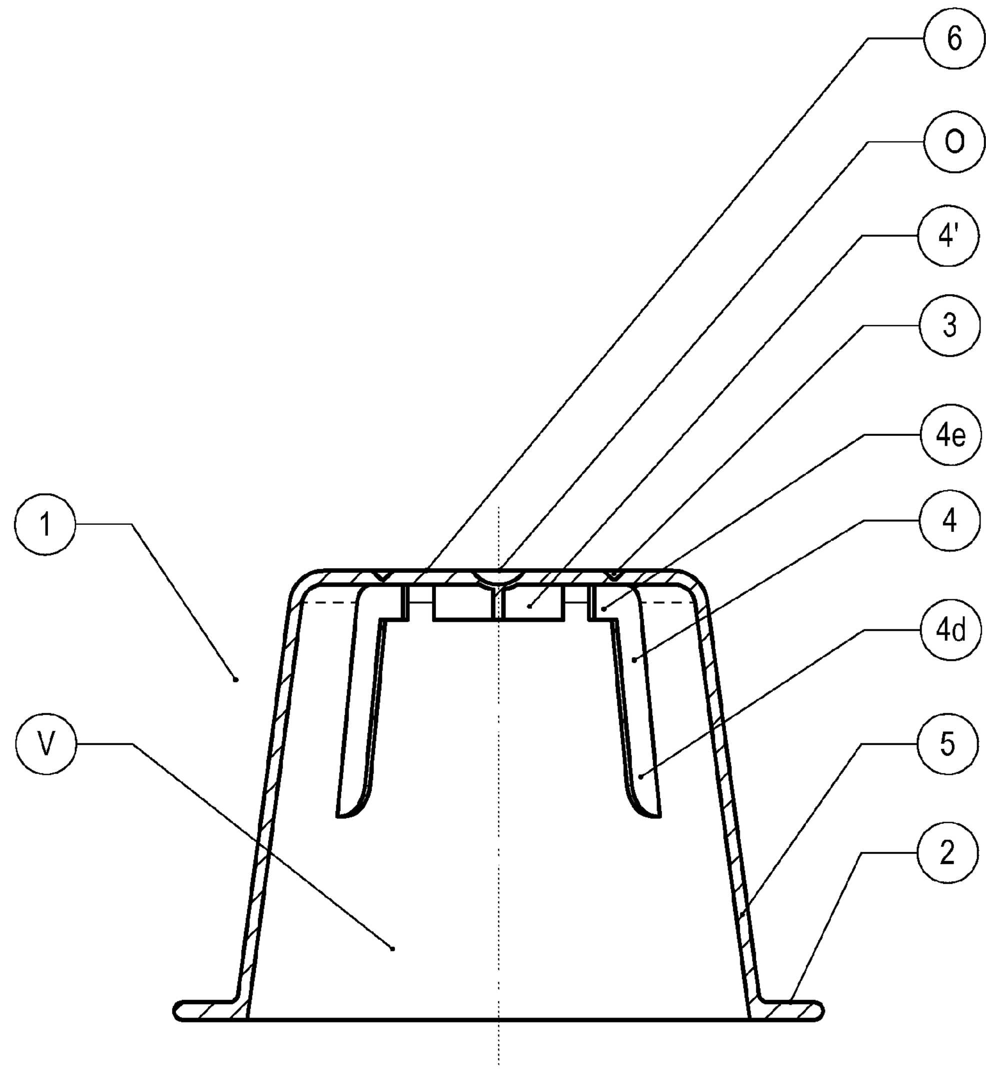
FIG. 12 schematically displays a cutaway section of the capsule shown in FIG. 10 along one of the diameters of the entry surface.

FIGS. 10, 11, and 12 show a further embodiment of the present invention. Even if FIGS. 4 to 9 show the employment of a capsule according, to the embodiment of the invention described with reference to FIGS. 1 to 3A, the same employment can be performed with the capsule shown in FIGS. 10, 11, and 12.

Capsule 1 shown in FIG. 10 comprises a side wall and an entry surface for the entrance of water under pressure inside the capsule 1.

The side wall 5 and the entry surface 6 are formed as a single body. In particular, the side wall 5 and the entry surface 6 are formed of the same material and may be manufactured, for example, by means of injection molding. For example, the side wall 5 and the entry surface 6 may be made of plastic deformable material. Furthermore, side wall 5 and entry surface 6 form the containment volume V for containing the infusion product or the water-soluble product for the production of the desired beverage. In the case shown in FIG. 10, the entry surface 6 corresponds to the bottom of the capsule 1.

Capsule 1 shown in FIG. 10 comprises a reduced thickness area 3 having a circular shape on the entry surface 6. The reduced thickness area 3 having a circular shape is centered in the center O of the entry surface 6. Furthermore, the reduced thickness area 3 is formed from the outside toward the inside so that the outer face of the entry surface 6 is not smooth and flat. Alternatively, the reduced thickness area 3 may be formed from the inside toward the outside of the capsule so that the outer face of the entry surface 6 is smooth and flat.

The reduced thickness area 3 having a circular shape shown in FIG. 10 is continuous, so as to depict a complete circle without interruptions. Alternatively, the reduced thickness area 3 having a circular shape may be discontinuous. It may, for example, be formed by a plurality of curved segments.

Furthermore, the capsule may comprise a plurality of reduced thickness circular areas, for example, a plurality of circular reduced thickness areas which are concentric. The capsule may, for example, comprise two or three circular reduced thickness areas which are concentric and preferably centered in the center of the entry surface 6.

Reduced thickness areas having a circular shape may, for example, have a thickness which varies between one half and one twentieth with respect to the thickness of the entry surface. Preferably, the reduced thickness areas have a thickness between one fifth and one fifteenth of the thickness of the entry surface. The reduced thickness areas may have, for example, a thickness corresponding to one tenth of the thickness of the entry surface. For example, the entry surface may have a thickness corresponding to 0.5 mm, while the reduced thickness areas may have a thickness corresponding to about 0.05 mm. Furthermore, the thickness of the reduced thickness areas 3 having circular shape could vary along the perimeter of the area itself. For example, the reduced thickness area 3 which is circular could have one or more portions having higher thickness with respect to the remaining portions of the circular area 3. Moreover, the thickness could vary in a continuous way along the perimeter of the reduced thickness area having a circular shape, going from a minimum thickness to a maximum thickness, with the maximum thickness that could be equal to or lower than the thickness of the entry surface 6.

FIG. 11 schematically displays an inner top view of the capsule 1 shown in FIG. 10.

The figure shows the upper surface of the plane 2.

The figure further shows the internal face of the entry surface 6 for the entrance of water under pressure. The circular reduced thickness area 3 of the entry surface 6 is shown by three dashed concentric lines.

The figure also shows that the capsule is provided with strengthening ribs 4. Strengthening ribs 4 strengthen the entry surface 6 and promote the opening of the reduced thickness circular areas 3 when water under pressure flows against the outer face of the entry surface 6.

The strengthening ribs 4 shown in FIG. 11 do not intersect the reduced thickness area 3. According to alternative embodiments of the present invention, one or more of the strengthening ribs 4 may intersect the reduced thickness area 3.

FIG. 11 further shows that the surface surrounded by the reduced thickness area is further provided with strengthening ribs 4'. These cross the center of the surface surrounded by the reduced thickness area 3. In particular, FIG. 11 shows two strengthening ribs 4' which are perpendicular to each other and intersect in the center of the surface surrounded by the reduced thickness area 3. The ribs 4' of the surface surrounded by the circular reduced thickness area 3 may be placed according to several arrangements on the surface. For example, they could be placed radially without intersecting. The number of ribs 4' may vary. Furthermore, according to further alternative embodiments of the present invention, the surface surrounded by the circular reduced thickness area 3 may not be provided with strengthening ribs 4'.

Moreover, the system shown in FIG. 11 comprises four strengthening ribs 4 radially placed with respect to the center O of the entry surface 6 so as to be equidistant from each other along the perimeter of the entry surface. Basically, the four strengthening ribs 4 are placed so as to divide the perimeter of the entry surface into four circular arcs, each of which corresponds to an angle of 90°. The number and the disposition of the strengthening ribs may vary. For example, the system may comprise two strengthening ribs placed in a symmetrical way with respect to the center of the entry surface (the perimeter of the entry surface is thus divided into two semi-circles) or three strengthening ribs (the perimeter of the entry surface could be divided into three arcs, each of which corresponds to an angle of 120°).

It has been observed that the presence of the strengthening ribs 4 is particularly advantageous because it allows the improvement of the opening of the circular reduced thickness area under the action of water under pressure flowing against the entry surface 6. In particular, strengthening ribs 4 stabilize and strengthen the circular outer region surrounding the reduced thickness area 3 and, therefore, decrease its elasticity with respect to the elasticity of the inner region surrounded by the reduced thickness area 3. Furthermore, the presence of the strengthening ribs 4 prevents that the entire area having reduced thickness 3 is opened under the action of water under pressure because the regions which are adjacent to the strengthening ribs 4 are strengthened by the ribs. When one or more portions of the circular-shaped reduced thickness area are opened under the action of water under pressure, water enters the capsule, and the pressure outside the capsule lowers. In this way, only portions of the perimeter of the reduced thickness area are opened. This can also be implemented if the circular-shaped reduced thickness area 3 does not have a constant thickness along its perimeter. In this way, the areas having lower thickness open under the action of water under pressure allowing water to enter the capsule and, thus, lowering the pressure outside the capsule. The areas having greater thickness do not open.

FIG. 12 schematically displays a cutaway section of capsule 1 shown in FIGS. 10 and 11 along one of the diameters of the entry surface 6, along which strengthening ribs 4 are realized.

The side wall 5 and the entry surface 6 form the containment volume V of the capsule 1, namely, the volume that can be filled with the product necessary for the production of the desired beverage.

The figure shows in section two portions of the reduced thickness area 3 of the entry surface 6. Furthermore, it is possible to see a depression in correspondence to the center O of the entry surface 6. This depression schematically displays the injection point of the capsule, namely, the point through which the material which forms the capsule is let flow during the manufacturing procedure of the capsule itself. The presence of this depression is advantageous because, in case material accumulates in correspondence with the injection point during the manufacture of the capsule, this accumulation of material falls on the bottom of the depression and does not protrude with respect to the outer face of the entry surface 6 of the capsule, thus avoiding the formation of protrusions or defects on the entry surface 6.

FIG. 12 shows in detail the structure of the strengthening ribs 4. Each of the strengthening ribs 4 comprises a first portion 4*d* extending along a direction substantially parallel to the side wall 5 of the capsule and adjacent to the side wall itself. Basically, each of the strengthening ribs 4 is formed in an integral manner with the side wall 5. In the example shown in FIG. 12, the first portion 4*d* of the strengthening rib 4 has a height corresponding to about half the height of the containment volume V of the capsule. The first portion may have different heights. For example, the first portion may occupy an entire height of the side wall of the capsule.

Moreover, each of the strengthening ribs comprises a second base portion 4*e*. The second base portion 4*e* extends along a portion of the diameter of the entry surface 6. In the example shown in FIG. 12, the second base portion 4*e* extends from the lateral surface 5 of the capsule to a position which is adjacent to the reduced thickness area 3. Basically, as can be seen in FIG. 12, portions 4*d* and 4*e* of each of the strengthening ribs 4 are such that the strengthening rib 4 is substantially L-shaped.

Even if the present invention was described with reference to the embodiments described above, it is now clear for the skilled person that it is possible to realize several modifications of the present invention in light of the above teaching and in the ambit of the appended claims without departing from the object and scope of protection of the invention.

For example, even if a capsule having a substantially circular horizontal cross-section was shown, the horizontal cross-section of the capsule may have different shapes, for example, polygonal shapes, such as a square, pentagon, or hexagon.

Furthermore, the capsule according to the present invention may have different sizes and, thus, contain different quantities of product.

Furthermore, the reduced thickness areas of the entry surface for the water under pressure may have several arrangements on the entry surface. The reduced thickness areas are not necessarily radial, but they can also be arranged so as to form partial circular crowns, curved segments, arcs, and the like, as schematically shown, for example, in FIGS. 10, 11, and 12.

The number and the arrangement of both the reduced thickness areas and the strengthening ribs may also vary.

Finally, those ambits that are deemed to be familiar for the skilled person have not been described in order not to unnecessarily obscure the invention described.

Consequently, the invention is not limited to the embodiments described above, but only by the scope of protection of the appended claims.

REFERENCE SIGNS

In each of the figures, the features are indicated as follows:

1 the capsule;
2 the support plane for the sealing element of the capsule;
3 the reduced thickness areas in the entry surface of the capsule;
4 the strengthening ribs on the entry surface of the capsule;
4*a* the base of a strengthening rib;
4*b* and 4*c* the arms of a strengthening rib;
4*d* and 4*e* the first and second portion of a strengthening rib;
4' further strengthening ribs;
5 the side wall of the capsule;
6 the entry surface for water under pressure of the capsule;
A the sealing element of the capsule;
B the hollow production cylinder for the liquid of the machine for using capsules;
C the peripheral edge of the hollow cylinder B;
C' the smooth peripheral edge of the hollow cylinder B;
C" the toothed peripheral edge of the hollow cylinder B;
D the disc carrying the needle of the machine for using capsules;
E the needle of the machine for using capsules;
F the hole for the entrance of water under pressure in the production cylinder of the machine;
I the beverage obtained;
O the center of the entry surface of the capsule;
P the product contained in the capsule;
V the containment volume of the capsule.

The invention claimed is:

1. A capsule for obtaining beverages comprising:

a side wall, an entry surface, and one or more strengthening ribs provided on the entry surface for the entrance of water under pressure into the capsule, said side wall and said entry surface forming a containment volume for containing an infusion product, wherein said entry surface having a first thickness comprises one or more elastically reclosable reduced thickness areas relative to the first thickness so that, letting water under pressure flow against said entry surface, said one or more elastically reclosable reduced thickness areas open so as to allow water under pressure to enter the capsule and said one or more elastically reclosable reduced thickness areas are made of elastic material so that, after having been opened by a flow of water under pressure, the one or more elastically reclosable reduced thickness areas return to a closing position when the flow of water under pressure is stopped.

2. The capsule according to claim 1, wherein said side wall and said entry surface are formed as a single body.

3. The capsule according to claim 1, further comprising a plane for supporting a sealing element so as to hermetically seal said capsule, said plane being provided at the extremity of said side wall opposite said entry surface so that said sealing element forms an exit surface opposite said entry surface for exit of the beverage from the capsule.

4. The capsule according to claim 3, wherein said plane for supporting said sealing element has a uniform thickness or comprises a groove on a surface of said plane which faces said entry surface, said groove being adapted to house a peripheral edge of a production volume of a beverages making machine when said capsule is housed in the production volume so as to seal the production volume.

5. The capsule according to claim 1, wherein said one or more elastically reclosable reduced thickness areas are located along one or more diameters of said entry surface.

6. The capsule according to claim 5, wherein said one or more elastically reclosable reduced thickness areas are placed radially with respect to a center of said entry surface.

7. The capsule according to claim 1 wherein said one or more elastically reclosable reduced thickness areas having circular shape.

8. The capsule according to claim 7, wherein said one or more elastically reclosable reduced thickness areas having circular shape are centered in a center of said entry surface.

9. The capsule according to claim 1, wherein the one or more strengthening ribs provided on said entry surface strengthens said entry surface and ease the opening of the one or more elastically reclosable reduced thickness areas when the flow of water under pressure flows against said entry surface.

10. The capsule according to claim 9, wherein said one or more strengthening ribs do not intersect said one or more elastically reclosable reduced thickness areas of said entry surface.

11. The capsule according to claim 9, wherein at least one of said one or more strengthening ribs intersects a center of said entry surface.

12. The capsule according to claim 9, wherein said one or more strengthening ribs are placed along one or more diameters of said entry surface.

13. The capsule according to claim 12, wherein said one or more strengthening ribs are placed radially with respect to a center of said entry surface.

14. The capsule according to claim 13, wherein said strengthening ribs intersect in the center of said entry surface.

15. The capsule according to claim 9, wherein said one or more strengthening ribs are made of elastic material so as to allow said entry surface to bend from an original configuration under the action of the flow of water under pressure and to return to the original configuration when the flow of water under pressure is stopped.

16. The capsule according to claim 15, wherein an elasticity of the one or more elastically reclosable reduced thickness areas is higher than an elasticity of said one or more strengthening ribs.

17. The capsule according to claim 9, wherein said one or more strengthening ribs are located inside the capsule.

18. The capsule according to claim 9, wherein at least one of said one or more strengthening ribs comprises a base portion substantially parallel and adjacent to said entry surface and an arm at each extremity of said base portion so that the at least one of said strengthening ribs is substantially U-shaped.

19. The capsule according to claim 9, wherein at least one of said one or more strengthening ribs comprises a first portion substantially parallel and adjacent to said side wall and a second portion substantially parallel and adjacent to said entry surface so that the at least one of said one or more strengthening ribs is substantially L-shaped.

20. A method for producing beverages by means of a capsule according to claim 1, wherein said method comprises the following step:

flowing water under pressure against the entry surface of the capsule so as to open the one or more elastically reclosable reduced thickness areas of the entry surface so as to allow the flow of water under pressure to enter the capsule, wherein the one or more elastically reclosable reduced thickness areas made of elastic material return to the closing position when the flow of water under pressure is stopped, after having being opened by the flow of water under pressure.

21. The method according to claim 20, further comprising the following step:

punching of an exit surface of the capsule opposed with respect to said entry surface so as to allow a beverage to exit from the capsule.

22. A capsule for containing a product used for making an infusion beverage with fluid under pressure comprising:

a cup-shape with sidewalls and a bottom entry surface opposing an open end wherein the bottom entry surface has a first thickness and a strengthening rib a seal placed over the open end;

an elastically reclosable area of reduced thickness relative to the first thickness of the bottom entry surface placed in the bottom entry surface, wherein said elastically reclosable area is made of an elastic material that has sufficient elasticity to open with a force of the fluid under pressure and close without the force of the fluid under pressure, whereby when the fluid under pressure is applied to the bottom entry surface said elastically reclosable area opens and when the fluid under pressure is stopped said elastically reclosable area returns to a closed position preventing undesired flow of the infusion beverage from said capsule once said capsule has been used.

23. The capsule as in claim 22 wherein:

wherein said elastically reclosable area comprises a plurality of elastically reclosable areas extending radially from a center of the bottom entry surface;

wherein said strengthening rib comprises a plurality of strengthening ribs extending radially from a center of the bottom entry surface; and wherein one each of the plurality of elastically reclosable areas is placed between pairs of the plurality of strengthening ribs.

* * * * *